J. WILLISON.
DRAFT RIGGING.
APPLICATION FILED APR. 27, 1905.
1,000,312.
Patented Aug. 8, 1911.
2 SHEETS—SHEET 1.
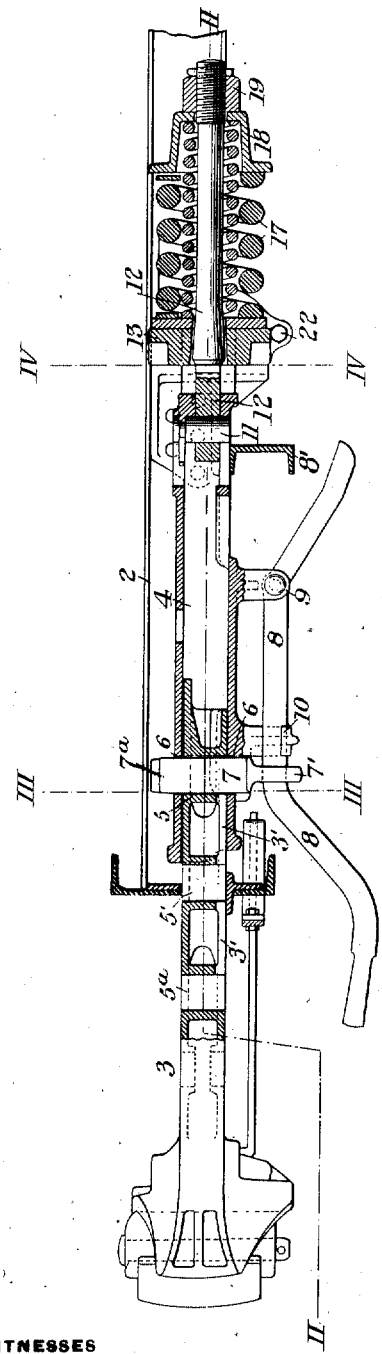
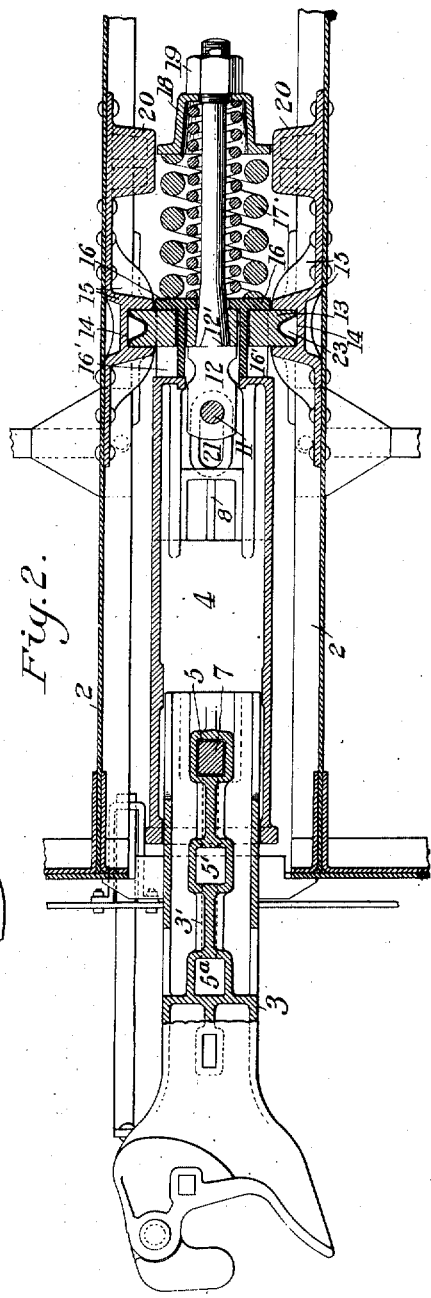

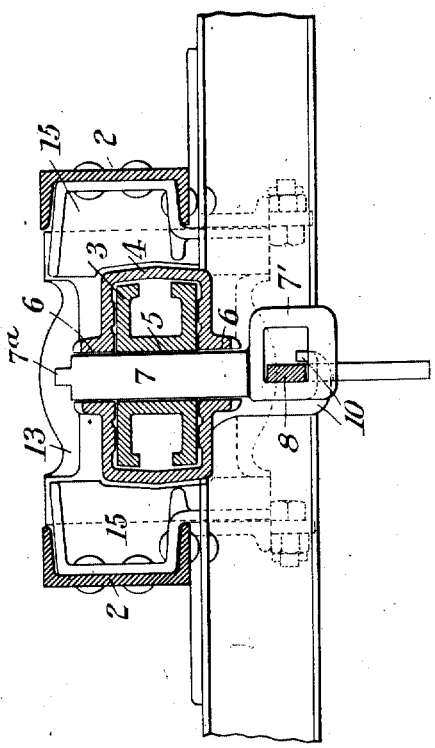

UNITED STATES PATENT OFFICE.

JOHN WILLISON, OF DERBY, ENGLAND, ASSIGNOR TO THE NATIONAL MALLEABLE CASTINGS COMPANY, OF CLEVELAND, OHIO, A CORPORATION OF OHIO.

DRAFT-RIGGING.

1,000,312. Specification of Letters Patent. Patented Aug. 8, 1911.

Application filed April 27, 1905. Serial No. 257,600.

*To all whom it may concern:*

Be it known that I, JOHN WILLISON, of Derby, Derby county, England, have invented a new and useful Draft-Rigging, of which the following is a full, clear, and exact description, reference being had to the accompanying drawings, forming part of this specification, in which—

Figure 1 is a central longitudinal section showing a draft-rigging constructed in accordance with my invention; Fig. 2 is a horizontal section on the line II—II of Fig. 1; Fig. 3 is a vertical section on the line III—III of Fig. 1; Fig. 4 is a vertical section on the line IV—IV of Fig. 1; Fig. 5 is a top plan view of the spring follower; Fig. 6 is a front elevation thereof; and Fig. 7 is a perspective view of the buffer plate.

My invention is designed to afford a draft-rigging of simple construction which will automatically adjust itself in central position and will afford advantages of compactness and great durability.

In the drawings, 2, 2 represent the draft-irons or draft-timbers which preferably form part of the car-frame, and between which the draft-rigging is arranged.

3 is the shank of the coupler, which is preferably set adjustably within a longitudinal holder-case 4 in which it is movable telescopically so as to vary the extent of its forward projection. In order to adjust it I provide the shank with vertical holes 5, 5', 5ª, preferably three in number, and I form registering holes 6 at the top and bottom of the case 4, so that when a pin or block 7 is inserted through the holes 6 and through one of the holes of the shank it will tie the case 4 and the draw-bar shank together, the latter projecting to an extent which depends upon the location of the particular hole in the shank which is utilized. For the purpose of holding and removing the pin 7 I preferably employ a lever 8 which is fulcrumed in a bracket 9 and is held in locked position by a second bracket 10, from which however it can be detached by raising the lever and moving it sidewise. The lever extends through a loop 7' at the lower end of the pin 7, and when the parts are in the position shown in Fig. 3 with the lever resting on the bracket 10, the pin is held securely in the hole in the case 4 and draw-bar shank 3. The upper end of the pin is preferably provided with a guiding projection 7ª which fits in the longitudinal groove 3' at the base of the shank and acts as a stop to limit the inward and outward movements of the coupler by contact with the respective ends of the groove. To remove the pin and to permit the draw-bar shank to be adjusted lengthwise in the case 4, the operator lifts the lever slightly and shifts it sidewise so as to free it from the bracket-pin, and then pulls it down until its rear end engages a stop 8' so as to draw the body of the pin below the draw-bar shank, and then moves the draw-bar shank lengthwise within the case until another hole 5 is brought into register with the pin. The pin is then raised by lifting the lever 8 so as again to pass it through the holes in the case and draw-bar shank, and the lever is again seated on the bracket 10.

The rear end of the case 4 is connected by a pin 11 with the forward end of a tail-bolt 12, which extends rearwardly therefrom through a hole in a buffer-plate or stop 13. This buffer-plate is set in a vertical guideway or recess 14 on a bracket 15 which is fixed to the draft-timbers or draft-irons, and on the rear side of the buffer-plate is a follower-plate 16 having forward projections 16' which extend through holes 13' in the buffer-plate and bear against the rear end of the case 4.

Back of the follower-plate 16 and encircling the tail-bolt 12 is a spring 17, the tension of which is adjustable on the tail-bolt by a suitable device, such as a cap 18 and nut 19. The cap 18 is confined by lugs 20 on the draft-irons so as to have only a limited lateral movement with the tail-bolt. These lugs 20 act as chafing plates to retain the cap 18 in a central position by their centering action. The hole in the case 4 through which the pin 11 passes is slotted as at 21 to permit the draft-rigging to have a longitudinal buffing movement. The buffer-plate 13 is supported by a suitable device, such as bolts 22 on the bracket 15, and the bracket is preferably provided with lugs 23 which extend in the vertical groove at the edges of the buffer-plate.

When the buffing force is applied to the coupler-head, the draw bar, which is made up of the coupler-shank 3, and the case 4, will move rearwardly, such motion being permitted by the slotted connection 21, and it will press back the follower-plate 16 by means of the projections 16', thus compressing the spring 17 against the cap 18 on the tail-bolt, the latter being held by opposite shoulders 12' which bear against the front face of the buffer-plate. When a pulling stress is applied to the coupler-head it will draw with it the tail-bolt 12 through the buffer-plate 13 and will compress the spring against the follower-plate 16 which is then held by the buffer-plate against forward movement. The pin 11 forms a connection between the tail-bolt and the coupler case so that draft strains are carried on this pin. The tail-bolt therefore has the shoulders to carry the buffing strains and the pin through the hole in its head to carry the draft strains. As the spring 17 is normally under tension, even when there are no stresses of buffing or draft, and therefore exerts a rearward pulling action on the draw-bar case 4 through the tail-bolt 12, this tension will hold the draw-bar in central position, and when it is deflected will automatically restore it to such central position.

Within the scope of my invention as defined in the claims the parts may be modified in many ways, since

What I claim is:—

1. The combination of a draw bar shank, a case slidably receiving the shank, one of these members having a series of openings and the other member having an opening for successive registration with the series of openings, a pin adapted to pass through registering openings in the case and shank, and means associated with the case for yieldably taking up draft and buffing strains.

2. A draft rigging having a draw bar shank, a case, the shank and case having registering openings, a shank-locking pin adapted to pass through the registering openings in the case and shank, and a lever by which the pin is operated.

3. A draft rigging having a draw bar shank, a case, the shank and case being provided with registering openings, a slotted shank-locking pin adapted to pass through the registering openings in the case and shank, and a lever working in the slot of said pin for controlling said pin.

4. A draft rigging having a draw bar shank, a case, the shank and case having registering openings, a shank-locking pin adapted to pass through the registering openings in the case and shank, a lever by which the pin is operated, and means for locking the lever.

5. A draft rigging having a draw bar, a shouldered tail bolt, a buffer plate for engagement by the shouldered portion of the tail bolt to oppose motion of the tail bolt in one direction, the tail bolt being movable in the other direction, and a spring to oppose movement of the tail bolt.

6. A draft rigging having a draw bar, a buffer plate, a tail bolt, a buffing spring, a follower plate having portions passing through the buffer plate and interposed between the buffing spring and the draw bar.

7. A draft rigging having a tail bolt, a buffer plate, a follower carried by the tail bolt and piercing the buffer plate, and a spring on the tail bolt engaging the follower and adapted to center the draft rigging automatically.

8. A draft rigging having a draw bar, a tail bolt, a buffer plate, said tail bolt having a shoulder to oppose motion of the tail bolt through the buffer plate in one direction and being movable therethrough in the other direction, a spring on the tail bolt, and a bracket having vertical recesses to receive the buffer plate.

9. A draft rigging having a draw bar, a tail bolt, a spring on the tail bolt, a cap on the tail bolt at the end of the spring, and chafing plates arranged to center the tail bolt cap.

10. A draft rigging having a draw bar, and a tail bolt having a slidable slot and pin connection with the draw bar, the pin being arranged to carry draft strains.

11. A draft rigging having a draw bar, a tail bolt having shoulders arranged to carry buffing strains, and a slot and pin connection between the draw bar and tail bolt, the pin being arranged to carry draft strains.

12. A draft rigging having a slotted draw bar, a tail bolt having shoulders, a buffing plate arranged to coact with the shoulders in supporting buffing strains, the tail bolt having a hole in its head, and a pin extending through said hole and the slotted portion of the draw bar, said pin being arranged to carry draft strains.

13. The combination of a draw bar, draft rigging associated therewith for taking up draft and buffing strains, the draw bar being slidably adjustable with respect to the rigging, means for interlocking the rigging and the draw bar, and a controller for the locking means.

14. A draft rigging having an endwise adjustable draw bar, locking means therefor, and a controller for the locking means located below the draw bar.

15. A draft rigging having an endwise adjustable draw bar, means for locking the draw bar in different adjusted positions, a controlling lever associated with the locking means and fulcrumed beneath the draw bar, and a keeper for engagement by the lever to hold the same in locked position.

16. A draft rigging having an endwise adjustable draw bar, locking means for the draw bar, a controlling lever fulcrumed beneath the draw bar, and a stop for engagement by the lever to support the same when the locking means is released.

17. A draft rigging having an endwise adjustable draw bar, locking means therefor, a vertically swinging controlling lever associated with the locking means and fulcrumed below the draw bar, a stop located above and in the path of the rear end of the lever to support the latter when the locking means is released, and a keeper for engagement by the lever in the active position of the locking means.

18. A draft rigging having telescopically adjustable draw bar members, means for adjustably interlocking the draw bar members, and a lock controller fulcrumed upon one of the draw bar members and arranged to operate the locking means.

19. A draft rigging having telescopically adjustable draw bar members, one of the members having a vertical opening and the other member having a series of openings for successive registration with the first mentioned opening, a locking pin for engagement with the registered openings to interlock the draw bar members, and a lever fulcrumed on the first mentioned draw bar member and associated with the locking pin for controlling the same.

20. In a draft rigging, a buffer plate, a draw bar having a member connected thereto piercing the buffer plate, and provided with a shoulder to engage the buffer plate and limit its rearward movement, a follower slidable upon said member in the rear of the buffer plate and having arms slidably piercing the buffer plate for engagement with the draw bar in front of the buffer plate, and a buffing spring bearing against the follower with a tendency to move the same forwardly.

In testimony whereof, I have hereunto set my hand.

JOHN WILLISON.

Witnesses:
JEANNETTE SACHEROFF,
HARRY E. ORR.